United States Patent
Wilson et al.

(10) Patent No.: US 11,544,579 B2
(45) Date of Patent: Jan. 3, 2023

(54) SYSTEM AND METHOD FOR GENERATING TRAINING DATA FOR MACHINE LEARNING CLASSIFIER

(71) Applicant: Primal Fusion Inc., Kitchener (CA)

(72) Inventors: Mathew Whitney Wilson, Kitchener (CA); Ihab Ilyas, Waterloo (CA); Peter J. Sweeney, Kitchener (CA)

(73) Assignee: Primal Fusion Inc., Kitchener (CA)

( * ) Notice: Subject to any disclaimer, the term of this patent is extended or adjusted under 35 U.S.C. 154(b) by 820 days.

(21) Appl. No.: 15/360,432

(22) Filed: Nov. 23, 2016

(65) Prior Publication Data
US 2018/0144268 A1    May 24, 2018

(51) Int. Cl.
   *G06N 5/02*    (2006.01)
(52) U.S. Cl.
   CPC .................................. *G06N 5/022* (2013.01)
(58) Field of Classification Search
   CPC ................................ G06N 5/022; G06N 5/02
   See application file for complete search history.

(56) References Cited

U.S. PATENT DOCUMENTS

| | | | |
|---|---|---|---|
| 5,689,620 A | 11/1997 | Kopec et al. | |
| 8,533,134 B1 | 9/2013 | Zhao et al. | |
| 8,954,358 B1 * | 2/2015 | Zhang | G06K 9/6292 382/225 |
| 9,195,646 B2 * | 11/2015 | Tsuchida | G06F 40/295 |
| 9,818,066 B1 | 11/2017 | Rammohan et al. | |
| 2008/0103996 A1 | 5/2008 | Forman et al. | |
| 2010/0185689 A1 | 7/2010 | Hu et al. | |
| 2012/0123978 A1 | 5/2012 | Toderice et al. | |
| 2014/0369597 A1 | 12/2014 | Shulman et al. | |
| 2015/0036919 A1 | 2/2015 | Bourdev | |
| 2015/0042296 A1 | 2/2015 | Cheng | |
| 2015/0073931 A1 * | 3/2015 | Ronen | G06Q 30/0631 705/26.7 |
| 2017/0185667 A1 | 6/2017 | Singh et al. | |
| 2017/0193393 A1 * | 7/2017 | Contractor | G06N 5/022 |

FOREIGN PATENT DOCUMENTS

JP    2013196680 A    6/2014

OTHER PUBLICATIONS

WIPO, International Search Report and Written Opinion for PCT Application No. PCT/CA2016/000288 dated Feb. 1, 2017.
USPTO, Office Action for U.S. Appl. No. 15/360,485 dated May 30, 2019.

(Continued)

*Primary Examiner* — Li Wu Chang
(74) *Attorney, Agent, or Firm* — Own Innovation; James W. Hinton

(57) ABSTRACT

Systems and methods are provided for generating training data for a machine-learning classifier. A knowledge representation synthesized based on an object of interest is used to assign labels to content items. The labeled content items can be used as training data for training a machine learning classifier. The labeled content items can also be used as validation data for the classifier.

33 Claims, 16 Drawing Sheets

(56) References Cited

OTHER PUBLICATIONS

Shin, H-C, et al., "Stacked Autoencoders for Unsupervised Feature Learning and Multiple Organ Detection in a Pilot Study Using 4D Patient Data", 2013, IEEE Transactions on Pattern Analysis and Machine Intelligence, vol. 35, No. 8, Aug. 2013 (Year: 2013).
USPTO, Office Action for U.S. Appl. No. 15/360,432 dated Nov. 19, 2019.
USPTO, Office Action for U.S. Appl. No. 15/360,454 dated Apr. 28, 2020.
USPTO, Office Action for U.S. Appl. No. 15/360,485 dated Mar. 4, 2020.
USPTO, Office Action for U.S. Appl. No. 15/360,485 dated Sep. 25, 2020.
USPTO, Office Action for U.S. Appl. No. 15/360,485 dated Apr. 27, 2021.
USPTO, Office Action for U.S. Appl. No. 15/360,454 dated May 26, 2021.
USPTO, Office Action for U.S. Appl. No. 15/360,454 dated Nov. 18, 2021.
EPO, Office Action for EP Application No. 16922104.1 dated Nov. 4, 2021.
JPO, Office Action for JP Application No. 2021-015547 dated Oct. 12, 2021.
EPO, Extended European Search Report for EP Application No. 16922104.1 dated Jun. 16, 2020.

* cited by examiner

Exemplary Object of Interest

| Content Item | Feature based on Attribute 1 | Feature based on Attribute 2 | Known Relevance | Classifier Prediction |
|---|---|---|---|---|
| 1 | 7 | 30 | Y | |
| 2 | 15 | 15 | N | |
| ... | | | | |
| 50 | 8 | 7 | Y | |
| 51 | 4 | 10 | N | N |
| ... | | | | |
| 99 | 5 | 10 | Y | N |
| 100 | 20 | 20 | Y | Y |
| 101 | 6 | 8 | ? | N |
| 102 | 7 | 12 | ? | Y |
| ... | | | | |
| n | | | | |

Rows 1–50: Training Data
Rows 51–100: Validation Data
Rows 101–n: Data to be classified Establish Model: Training Data + Validation Data
Apply Model: Data to be classified

FIG. 11

| Content Item | Feature based on Attribute 1 | Feature based on Attribute 2 | Known Relevance | Classifier 1 Prediction | Classifier 2 Prediction |
|---|---|---|---|---|---|
| 1 | 7 | 30 | Y | | |
| 2 | 15 | 15 | N | | |
| ... | | | | | |
| 50 | 8 | 7 | Y | | |
| 51 | 4 | 10 | N | N | N |
| ... | | | | | |
| 99 | 5 | 10 | Y | N | N |
| 100 | 20 | 20 | Y | Y | N |
| 101 | 6 | 8 | ? | N | N |
| 102 | 7 | 12 | ? | Y | N |
| ... | | | | | |
| n | | | | | |

Training Data: items 1–50; Validation Data: items 51–99; Establish Model covers Training + Validation.
Data to be classified: items 100–n; Apply Model.

FIG. 12

| Content Item | Classifier 1 Prediction | Classifier 2 Prediction | Classifier 3 Prediction | Overall | Recommend? |
|---|---|---|---|---|---|
| 101 | Yes | Yes | Yes | 1 | Yes |
| 102 | Yes | No | Yes | 0.67 | Yes |
| 103 | No | No | Yes | 0.33 | No |
| 104 | Yes | No | No | 0.33 | No |
| 105 | No | No | No | 0 | No |

FIG. 13

| Content Item | Feature based on Attribute 1 | Feature based on Attribute 2 | ... | Known Relevance | Predicted Relevance | Classifier Correct? |
|---|---|---|---|---|---|---|
| 1 | 10 | 10 | | Y | Y | Y |
| 2 | 9 | 2 | | Y | Y | Y |
| 3 | 8 | 3 | | N | Y | N |
| 4 | 7 | 10 | | Y | Y | Y |
| 5 | 6 | 6 | | N | Y | N |
| 6 | 5 | 5 | | N | N | Y |
| 7 | 4 | 10 | | Y | N | N |
| 8 | 3 | 10 | | Y | N | N |

| Content Item | Feature based on Attribute 1 | Feature based on Attribute 2 | ... | Known Relevance | Predicted Relevance | Classifier Correct? |
|---|---|---|---|---|---|---|
| 1 | 10 | 15 | | Y | Y | Y |
| 2 | 9 | 10 | | Y | Y | Y |
| 3 | 8 | 3 | | N | Y | N |
| 4 | 7 | 16 | | Y | Y | Y |
| 5 | 6 | 6 | | N | N | Y |
| 6 | 5 | 5 | | N | N | Y |
| 7 | 4 | 18 | | Y | Y | Y |
| 8 | 3 | 17 | | Y | N | N |

SYSTEM AND METHOD FOR GENERATING TRAINING DATA FOR MACHINE LEARNING CLASSIFIER

FIELD

The teachings described herein relate to the field of machine learning and information retrieval. In particular, the teachings disclosed herein relate to the deployment of methods, in a digital information system environment, for using information associated with one or more data sets expressed as knowledge representations to classify information, train classifier models to classify information, and/or use classifier results to refine knowledge representations.

BACKGROUND

Information technology is often used to provide users with various types of information, such as text, audio, video, and any suitable other type of information. In some cases, information is provided to a user in response to an action that the user has taken. For example, information may be provided to a user in response to a search query input by the user or in response to the user's having subscribed to content such as an e-mail alert or an electronic newsletter. In other cases, information is provided or "pushed" to a user without the user having specifically requested such information. For example, a user may occasionally be presented with advertisements or solicitations.

There is a vast array of content and information that can be provided to users via information technology. Indeed, because of the enormous volume of information available via the Internet, the World Wide Web (WWW), and any other suitable information provisioning sources, and because the available information is distributed across an enormous number of independently owned and operated networks and servers, locating information of interest to users presents challenges. Similar challenges exist when the information of interest is distributed across large private networks.

SUMMARY

The inventive concepts presented herein are illustrated in a number of different embodiments, each showing one or more concepts, though it should be understood that, in general, the concepts are not mutually exclusive and may be used in combination even when not so illustrated.

Some embodiments provide for a method of generating training data for a machine learning classifier, the method comprising: receiving a knowledge representation, encoded as a non-transitory computer-readable data structure, based on an object of interest, the knowledge representation comprising at least one concept and/or relationship between two or more concepts; receiving a first set of content items, wherein the first set comprises one or more content items without a label, wherein the label classifies a content item into one or more categories; determining one or more scores for one or more respective content items of the first set, wherein the score for a respective content item is based on the knowledge representation and contents of the respective content item; and generating the training data for the machine learning classifier by assigning a label to the one or more respective content items of the first set based on the score associated with the one or more respective content items of the first set.

Some embodiments provide for a system for generating training data for a machine learning classifier, the system comprising: at least one processor configured to perform a method comprising: receiving a knowledge representation, encoded as a non-transitory computer-readable data structure, based on an object of interest, the knowledge representation comprising at least one concept and/or relationship between two or more concepts; receiving a first set of content items, wherein the first set comprises one or more content items without a label, wherein the label classifies a content item into one or more categories; determining one or more scores for one or more respective content items of the first set, wherein the score for a respective content item is based on the knowledge representation and contents of the respective content item; and generating the training data for the machine learning classifier by assigning a label to the one or more respective content items of the first set based on the score associated with the one or more respective content items of the first set.

Some embodiments provide for at least one non-transitory computer readable storage medium storing processor-executable instructions that, when executed by at least one processor, cause the at least one processor to perform a method of generating training data for a machine learning classifier, the method comprising: receiving a knowledge representation, encoded as a non-transitory computer-readable data structure, based on an object of interest, the knowledge representation comprising at least one concept and/or relationship between two or more concepts; receiving a first set of content items, wherein the first set comprises one or more content items without a label, wherein the label classifies a content item into one or more categories; determining one or more scores for one or more respective content items of the first set, wherein the score for a respective content item is based on the knowledge representation and contents of the respective content item; and generating the training data for the machine learning classifier by assigning a label to the one or more respective content items of the first set based on the score associated with the one or more respective content items of the first set.

Some embodiments provide for a method of classifying, with a machine-learning classifier, at least one unlabeled content item, the method comprising: receiving a knowledge representation, encoded as a non-transitory computer-readable data structure, based on an object of interest, the knowledge representation comprising at least one concept and/or relationship between two or more concepts; receiving training data, the training data comprising a first set of one or more labeled content items having a label that classifies each content item into one or more categories; training the machine-learning classifier with at least one feature of the labeled content item based on one or more attributes derived from the knowledge representation; and classifying, with the machine-learning classifier, the at least one unlabeled content item into the one or more categories using at least one feature of the unlabeled content item based on the one or more attributes derived from the knowledge representation.

Some embodiments provide for a system for classifying, with a machine-learning classifier, at least one unlabeled content item, the system comprising: at least one processor configured to perform a method comprising: receiving a knowledge representation, encoded as a non-transitory computer-readable data structure, based on an object of interest, the knowledge representation comprising at least one concept and/or relationship between two or more concepts; receiving training data, the training data comprising a first set of one or more labeled content items having a label that classifies each content item into one or more categories; training the machine-learning classifier with at least one feature of the labeled content item based on one or more attributes derived from the knowledge representation; and classifying with the machine-learning classifier, the at least one unlabeled content item into the one or more categories using at least one feature of the unlabeled content item based on the one or more attributes derived from the knowledge representation.

Some embodiments provide for at least one non-transitory computer readable storage medium storing processor-executable instructions that, when executed by at least one processor, cause the at least one processor to perform a method of classifying, with a machine-learning classifier, at least one unlabeled content item, the method comprising: receiving a knowledge representation, encoded as a non-transitory computer-readable data structure, based on an object of interest, the knowledge representation comprising at least one concept and/or relationship between two or more concepts; receiving training data, the training data comprising a first set of one or more labeled content items having a label that classifies each content item into one or more categories; training the machine-learning classifier with at least one feature of the labeled content item based on one or more attributes derived from the knowledge representation; and classifying with the machine-learning classifier, the at least one unlabeled content item into the one or more categories using at least one feature of the unlabeled content item based on the one or more attributes derived from the knowledge representation.

Some embodiments provide for a method of modifying a knowledge representation based on a machine-learning classifier, the method comprising: receiving a knowledge representation encoded as a non-transitory computer-readable data structure, based on an object of interest, the knowledge representation comprising at least one concept and/or relationship between two or more concepts; receiving validation data, the validation data comprising a first set of one or more labeled content items having a label that classifies each content item into one or more categories including a first category known to be relevant to the object of interest and a second category known to not be relevant to the object of interest; predicting, with a machine-learning classifier that uses at least one attribute derived from the knowledge representation as a feature, each of the one or more labeled content items as one of: a) relevant to the object of interest or b) not relevant to the object of interest; and modifying the knowledge representation based on a comparison of the prediction by the machine-learning classifier for each content item of the first set to the label of each respective content item.

Some embodiments provide for a system for modifying a knowledge representation based on a machine-learning classifier, the system comprising: at least one processor configured to perform a method comprising: receiving a knowledge representation encoded as a non-transitory computer-readable data structure, based on an object of interest, the knowledge representation comprising at least one concept and/or relationship between two or more concepts; receiving validation data, the validation data comprising a first set of one or more labeled content items having a label that classifies each content item into one or more categories including a first category known to be relevant to the object of interest and a second category known to not be relevant to the object of interest; predicting, with a machine-learning classifier that uses at least one attribute derived from the knowledge representation as a feature, each of the one or more labeled content items as one of: a) relevant to the object of interest or b) not relevant to the object of interest; and modifying the knowledge representation based on a comparison of the prediction by the machine-learning classifier for each content item of the first set to the label of each respective content item.

Some embodiments provide for at least one non-transitory computer readable storage medium storing processor-executable instructions that, when executed by at least one processor, cause the at least one processor to perform a method of modifying a knowledge representation based on a machine-learning classifier, the method comprising: receiving a knowledge representation encoded as a non-transitory computer-readable data structure, based on an object of interest, the knowledge representation comprising at least one concept and/or relationship between two or more concepts; receiving validation data, the validation data comprising a first set of one or more labeled content items having a label that classifies each content item into one or more categories including a first category known to be relevant to the object of interest and a second category known to not be relevant to the object of interest; predicting, with a machine-learning classifier that uses at least one attribute derived from the knowledge representation as a feature, each of the one or more labeled content items as one of: a) relevant to the object of interest or b) not relevant to the object of interest; and modifying the knowledge representation based on a comparison of the prediction by the machine-learning classifier for each content item of the first set to the label of each respective content item.

The foregoing is a non-limiting summary of the invention, which is defined by the attached claims, it being understood that this summary does not necessarily describe the subject matter of each claim and that each claim is related to one or some, but not all, embodiments.

BRIEF DESCRIPTION OF DRAWINGS

The accompanying drawings are not intended to be drawn to scale. Like elements are identified by the same or like reference designations when practical. For the purposes of clarity, not every component may be labelled in every drawing. In the drawings:

FIG. 11 is an illustration of an example table showing attribute-based features associated with content items, the known relevance of the content items, and the prediction by the classifier, in accordance with some embodiments of the present invention;

FIG. 12 is an illustration of an example table showing attribute-based features associated with content items, the known relevance of the content items, and the prediction by a first classifier and a second classifier, in accordance with some embodiments of the present invention;

FIG. 13 is an illustration of an example table showing the results of predictions made by a plurality of classifier models, in accordance with some embodiments of the invention;

DETAILED DESCRIPTION

The sheer volume of content accessible via digital information systems presents a number of information retrieval challenges. One challenging problem is how to determine what information, in a large set of content, may be of interest to users so that such information may be presented to the users without overwhelming them with irrelevant information. Moreover, another challenging problem is how to identify information that may be of interest in a computationally efficient manner.

Figure 1:
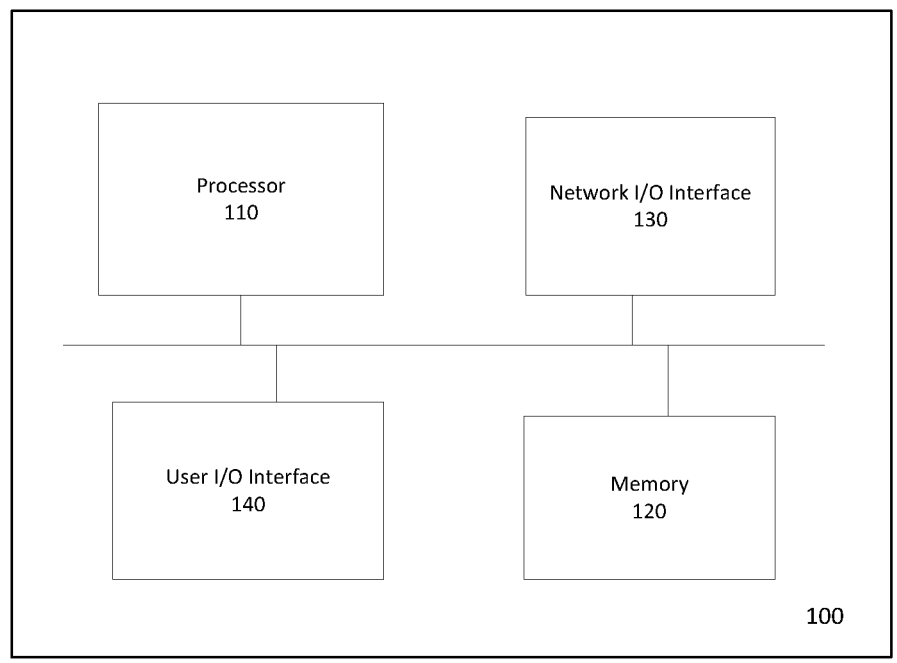
FIG. 1 is a block diagram illustrating an exemplary computing system for use in practicing some embodiments of the present invention.

The systems and methods described herein may be implemented in a variety of ways. FIG. 1 is a block diagram illustrating an exemplary computing system for use in practicing some embodiments of the present invention described herein.

The computing device 100 may include one or more processors (e.g., microprocessors) 110 and one or more tangible, non-transitory computer-readable storage media (e.g., memory 120). Memory 120 may store, in tangible, non-transitory computer-readable storage media computer instructions that implement any of the functionality described herein. Processor(s) 110 may be coupled to memory 120 and may execute such computer instructions to cause the functionality to be realized and performed. Computing device 100 may also include a network input/output (I/O) interface 130 via which the computing device 100 may communicate with other computers (e.g., over a network). In some embodiments, the computing device may also include one or more user I/O interfaces 140, via which the computer may provide output to and receive input from a user. The user I/O interface 140 may include devices such as a keyboard, a mouse, a microphone, a display device (e.g. a monitor or touchscreen), speakers, a camera, and/or various other types of I/O devices.

Some embodiments of the present invention use machine-learning algorithms to train classifiers, in particular supervised learning. Supervised learning is a branch of machine learning involving the task of inferring a function from labeled training data. The training data comprises a set of training examples. In supervised learning, each training example may comprise an object (e.g. a content item) and a label (which, for example, may classify the content item into one or more categories). A supervised learning algorithm can analyze the training data and produce an inferred function (e.g. a classifier model), which can then be used to predict a label for (or otherwise classify) an unlabeled content item.

A machine-learning classifier trained using, for example, supervised learning, can be used to assign labels to unlabeled content items. However, in order to train a classifier, substantial amounts of training data are required. In some embodiments, training data comprises content items having labels that classify each content item into categories. Without sufficient training data to train the classifier, it is difficult for machine-learning algorithms to yield models which produce accurate results.

Figure 2:
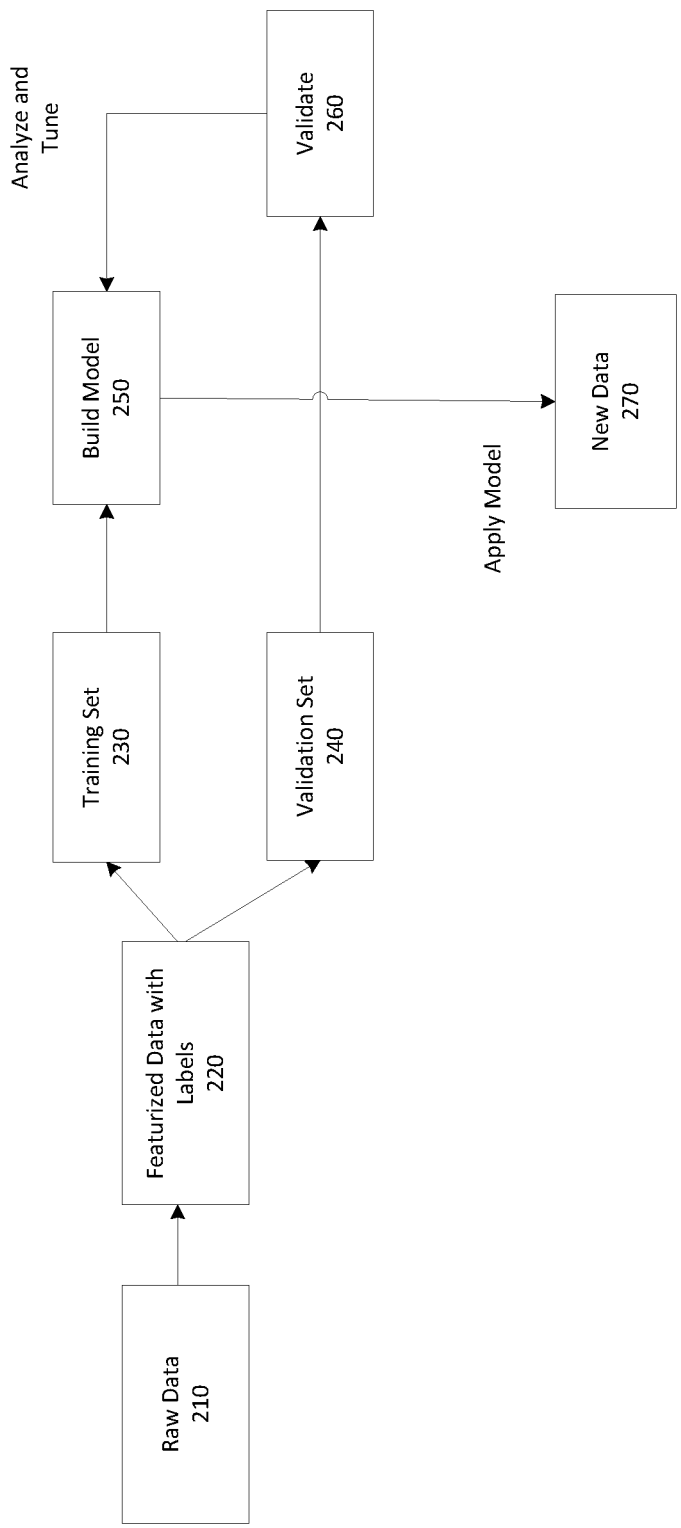
FIG. 2 is a flowchart illustrating an exemplary workflow for supervised learning techniques in accordance with some embodiments of the present invention.

FIG. 2 is a flowchart illustrating an exemplary workflow for supervised learning techniques in accordance with some embodiments of the present invention. The process begins with raw data 210. Raw data 210 may comprise one or more content items. In order to be useful for machine-learning purposes, the raw data 210 is converted to featurized data with labels 220 by assigning labels to each content item in raw data 210. The labels may be binary in nature (e.g. "yes" or "no", or "1" or "0" labels). However, there may also be more than two possible labels. Labels may be assigned to raw data 210 any number of ways. For example, a human operator could manually review each item in raw data 210 and assign a label.

Once labeled, the featurized data 220 may be divided into training set 230 and validation set 240. The featurized data can be divided between training set 230 and validation set 240 in any proportion. The training set 230 is then used as a basis for building (referred to hereinafter as training) a model 250. The model 250 can be conceptualized as a function which is inferred from correlations between the known label for a content item and various features of that content item. One of the purposes of the model 250 is for use in assigning a label to unlabeled content items based on the features of the unlabeled content items in a manner consistent with the labels which were assigned to the training set 230 and the features associated with the training set 230.

Once a model 250 has been trained, the model 250 can be validated at 260 using validation set 240. One way of validating the model 250 is to apply the model 250 to the validation set 240 and obtain labels for each content item in the validation set 240. Since the validation set 240 already contains content items with known labels, the known labels can then be compared to the labels generated by the model 250 to determine how accurate the model 250 is at correctly predicting labels.

The validated model 250 can then be applied to unlabeled content items and used to generate labels. In this manner, large volumes of data can be labeled and/or classified by the model within a reasonable degree of accuracy. However, as noted above, generally a large amount of training data is required in order to train a model. It would be desirable to obtain training data in a manner which is computationally efficient and does not require the manual labeling of content items.

Figure 3:
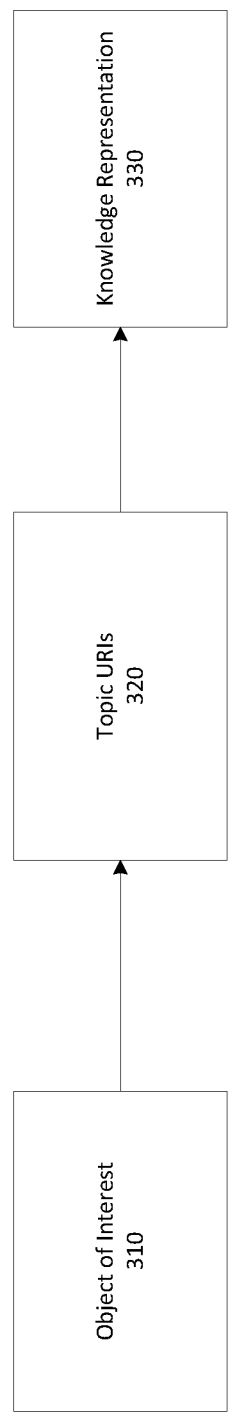
FIG. 3 is a flowchart illustrating an exemplary workflow for synthesizing a knowledge representation based on an object of interest in accordance with some embodiments of the present invention.

FIG. 3 is a flowchart illustrating an exemplary workflow for synthesizing a knowledge representation based on an object of interest in accordance with some embodiments of the present invention. The object of interest ("OOI") 310 is analyzed and terms and/or other properties contained in the OOI 310 are used to generate one or more topic uniform resource identifiers 320 (topic URIs). The topic URIs 320 are then used as a basis for synthesizing a knowledge representation 330 which includes a number of additional concepts and/or relationships between concepts, some of which are not found in the OOI 310.

Figure 4:
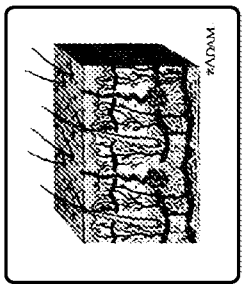
FIG. 4 is an illustration of an example object of interest, according to some embodiments of the present invention.

FIG. 4 is an illustration of an example OOI, according to some embodiments of the present invention. Although the exemplary OOI 310 in FIG. 4 is a single web page, it should be appreciated that an OOI may extend to a website covering several webpages or several websites and may include any suitable type of unstructured data made up of a corpus/corpora that presents an item of interest. In some embodiments, the OOI 310 may comprise a topic, a tweet, a webpage, a website, a document, a document title, a message, an advertisement, and/or a search query; in some embodiments, the OOI 310 may be a single instance of the foregoing objects (e.g., a simple topic, a single document, etc.) or may comprise a collection of said objects (e.g., a collection of topics relevant to an individual's interest, a group of documents relevant to an individual's interest, or the like). Moreover, the OOI 310 may include various types of items relevant to a specific user (e.g., a user's tweet and a document of interest to that same user) and may extend to items across various users (e.g., items relevant to a specific market or population segment of interest). OOI 310 may include both online and offline objects.

As will be appreciated, by varying the scope of the contents contained within OOI 310, the amount and depth of the topic URIs 320 extracted therefrom will vary, and the synthesized knowledge representation 330 resulting therefrom will in turn vary. Thus, it is possible to obtain a balance between the degree of focus and the volume of concepts and/or relationships contained within the knowledge representation 330. For example, an OOI 310 containing more expansive data will represent a larger domain and provide a greater scope over which to generate topic URIs 320 and synthesize data. Contrastingly, when using a topic as an OOI 310, such as a phrase of few words, the topic would be the sole lens for synthesizing data.

Figure 5:
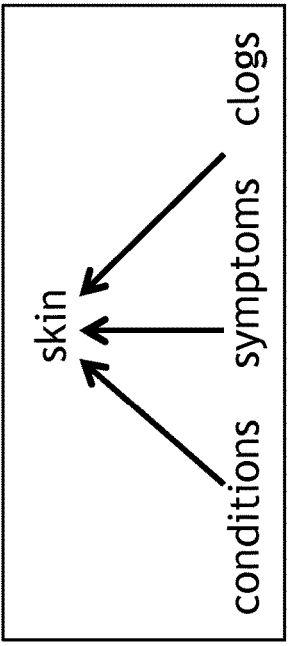
FIG. 5 is an illustration of an exemplary workflow for extracting topic uniform resource identifiers based on an object of interest, according to some embodiments of the invention.
Figure 5:
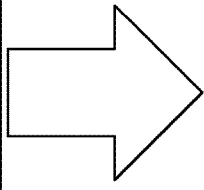

FIG. 5 is an illustration of an exemplary workflow for extracting topic URIs based on an object of interest, according to some embodiments of the invention. For the purposes of clarity, the OOI 310 shown in FIG. 5 is the same webpage shown in FIG. 4. The topic URIs 320 generated from the OOI 310 are shown in both linear and hierarchical fashion. As can be seen, the term "skin" is identified, and the subtopics of conditions, symptoms and clogs are shown as related to skin. It should be noted that the hierarchical and linear representations of the topic URIs 320 are two different ways of representing of the same relationships.

Figure 6:
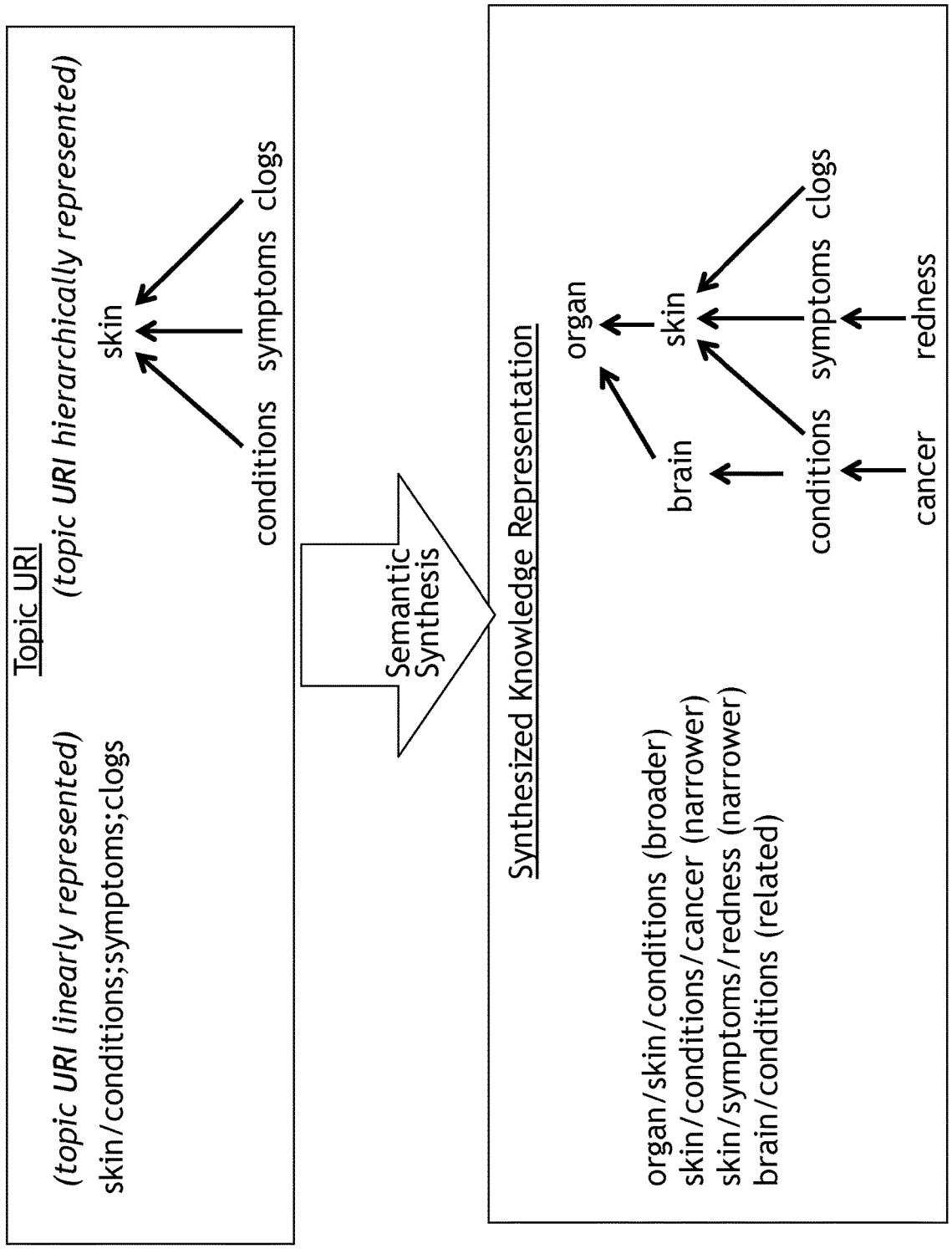
FIG. 6 is an illustration of an exemplary workflow for synthesizing a knowledge representation based on topic uniform resource identifiers extracted from an object of interest, according to some embodiments.

FIG. 6 is an illustration of an exemplary workflow for synthesizing a knowledge representation 330 based on topic URIs 320 generated from an object of interest 310, according to some embodiments. As can be seen, the knowledge representation 330 contains additional concepts, namely "organ", "brain", "cancer" and "redness", which are identified as having relationships with other concepts in the topic URIs 320. These additional concepts and relationships between concepts can be obtained, for example, from sources which are external to the object of interest. For example, a thesaurus, dictionary, other content items, or various tautologies can be used to identify additional concepts and relationships. As mentioned above, it should be appreciated that knowledge representation 330 may be a product of various types of objects of interest comprising a broad array of unstructured data, e.g. a collection of documents known to be of interest to a user.

It should be noted that although specific examples are provided herein, there are many ways of synthesizing a knowledge representation 330. Further examples can be found, for example, in U.S. Pat. No. 9,378,203 and U.S. patent application Ser. No. 13/345,637, the contents of which are incorporated by reference in their entirety. In some embodiments, an atomic knowledge representation model (AKRM) may include one or more elemental data structures and one or more knowledge processing rules. In some embodiments, rules may be used by the system to deconstruct (analyze) one or more complex KRs to generate an elemental data structure. For example, the system may include one or more computer processors and one or more computer memory hardware components, and the memory may be encoded with computer-executable instructions that, when executed by the one or more processors, cause the one or more processors of the system to use the rules in the analysis of one or more complex KRs to generate an elemental data structure of the AKRM. The memory may also be encoded with instructions that program the one or more processors to use the rules to synthesize new complex KRs from elemental data structures. In some embodiments, the computer memory may be implemented as one or more tangible, non-transitory computer-readable storage media encoded with computer-executable instructions that, when executed, cause one or more processors to perform any of the functions described herein.

The synthesized knowledge representation 330 can be used to evaluate the relevance of other content items. For example, using the example from FIG. 6, other content items can be analyzed for the presence of one or more of the concepts found in the synthesized knowledge representation. A score can be generated based on such an analysis which can be used as an indicator of the potential relevance of the content item relative to the OOI 310. Moreover, a weight can be assigned to different concepts in the synthesized knowledge representation 330. Such a weight may be used to indicate that a particular concept in the knowledge representation 330 is more likely correlated to relevance as compared to another concept in the knowledge representation. The score for a content item can be determined, for example, by taking a weighted sum of the concepts. In some embodiments, the score for a content item may be determined based on an intersection of the one or more concepts in the knowledge representation 330 and the contents of the content item.

Figure 7:
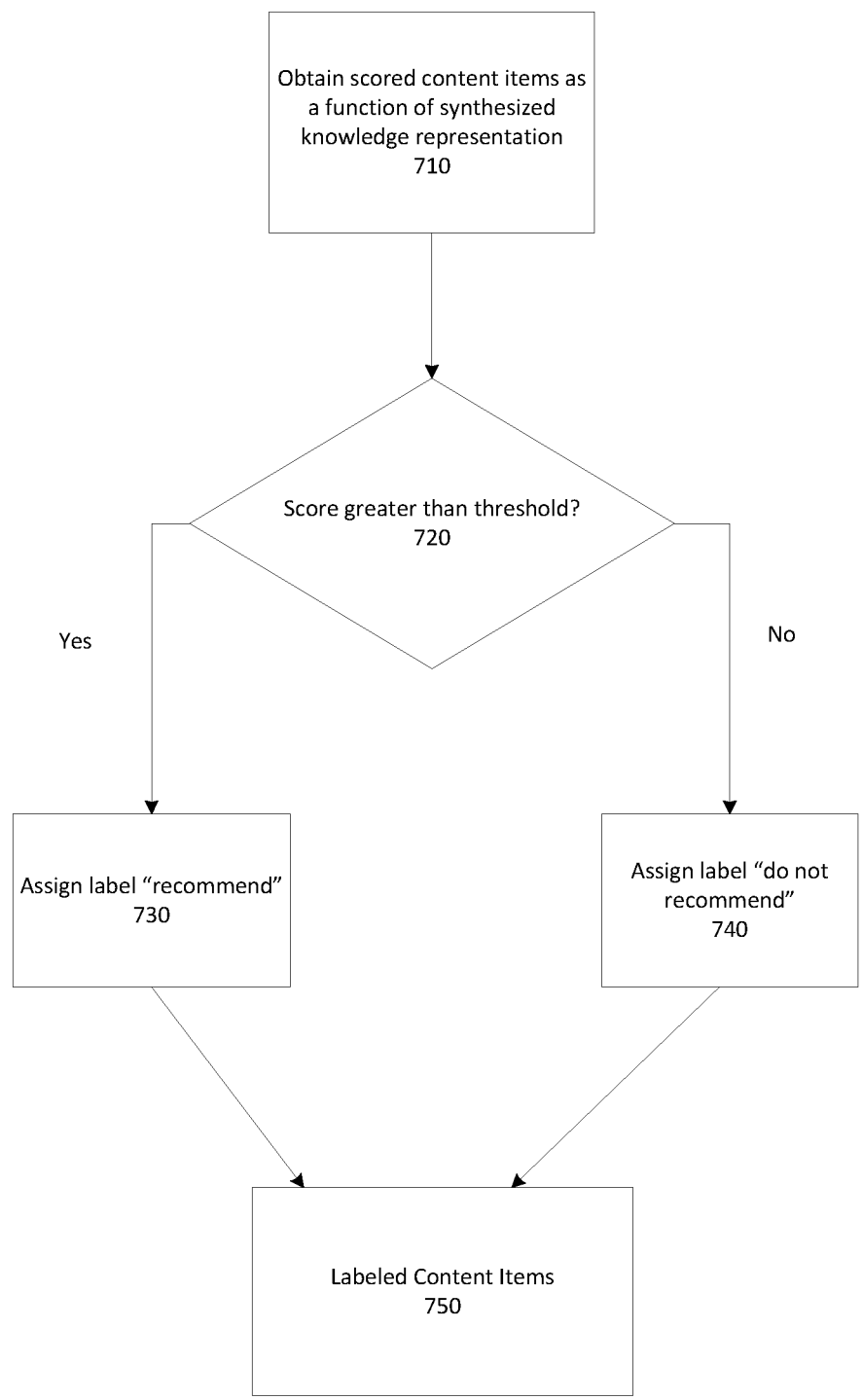
FIG. 7 is a flowchart illustrating an exemplary method for labelling content items in accordance with some embodiments of the present invention.

FIG. 7 is a flowchart illustrating an exemplary method for labelling content items according to a score, in accordance with some embodiments of the present invention. At 710, one or more scored content items are obtained. In some embodiments, the items are scored based on knowledge representation 330, which is based on an object of interest 310. At 720, each content item is compared to a predetermined threshold score. If the score for a content item is greater than the threshold, then the content item is labelled "recommend" at 730. If the score for the content item is less than or equal to the threshold score, then the content item is labelled as "do not recommend". The content items with the "recommend" and "do not recommend" labels then form a set of labeled content items 750. In some embodiments, the content items may be ranked by score, and a label may be assigned based on the ranking of a content item within the set, rather than based purely on the score. For instance, for ten scored content items received at 710, at 720 it may be determined whether a content item was ranked in the top three of the total ten content items.

It should be noted that although FIG. 7 shows two possible labels for a content item, the present invention also contemplates the use of more than two labels, and for multi-tiered labels (e.g. multiple label options) rather than binary labels (e.g. "yes" or "no"). For example, labels may include "recommend", with the next lowest tier being "suggested", followed by "do not recommend". The tiers may be expanded to any suitable number of labels and/or categories. Moreover, the labels need not be hierarchical but may be establish associative categories (e.g., sports, politics, technology, etc.)

Figure 8A:
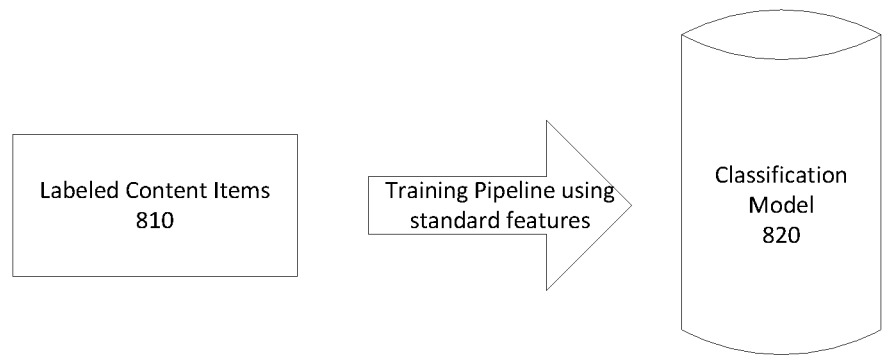
FIG. 8A is an illustration of an exemplary workflow for training a classifier model in accordance with some embodiments of the present invention.

As noted above, the set of labeled content items 750 comprises one or more content items having a label associated therewith. FIG. 8A is an illustration of an exemplary workflow for training a classification model 820 in accordance with some embodiments of the present invention. A set of labeled content items 810 can be used as training data (e.g., training set 230 described herein) in order to build a machine-learning classifier model 820. In some embodiments, the set of labelled content items 810 is generated by the process described in FIG. 7.

In some embodiments, training classification model 820 based on labeled content items 810 comprises, for each labeled content item, a comparison of various features of the content item and the label associated with the content item. In some embodiments, these features may include standard features, examples of which include title, length, author, term frequency, and/or inverse document frequency. In some embodiments, these features may include one or more attributes of the knowledge representation. The classification model 820 includes an inferred function which can be used to determine which label should be assigned to a particular content item, based on the features of the particular content item.

Figure 8B:
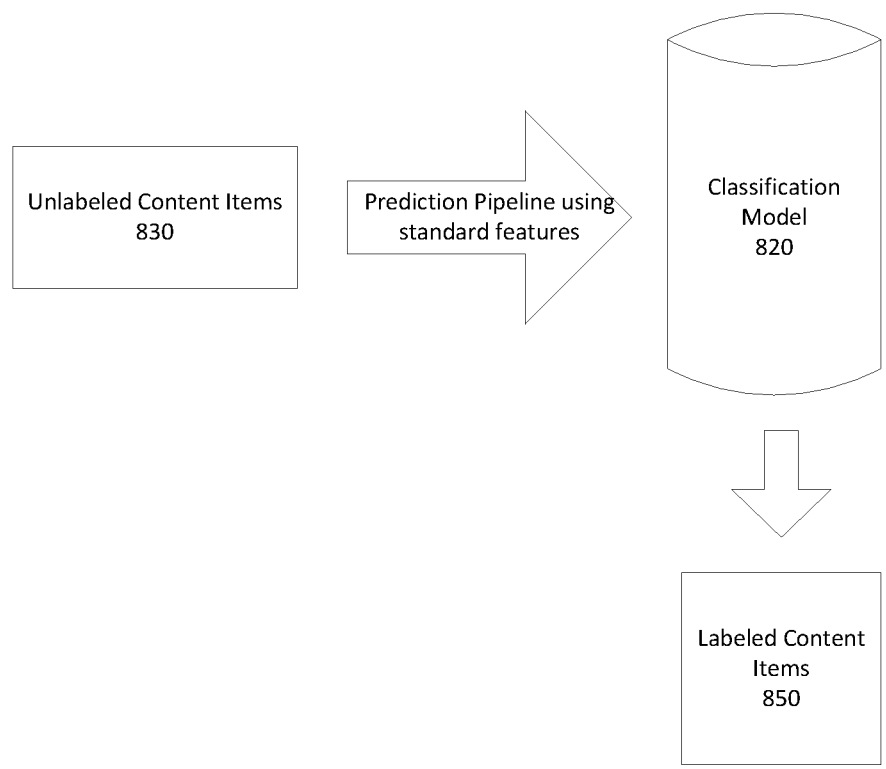
FIG. 8B is an illustration of an exemplary workflow for using the classifier model of FIG. 8A to label content items in accordance with some embodiments of the present invention.

FIG. 8B is an illustration of an exemplary workflow for using the classification model 820 of FIG. 8A to label content items, in accordance with some embodiments of the present invention. Once the classification model 820 has been trained, and optionally validated using additional labeled validation data, the classification model 820 can be used to assign labels to a set of one or more unlabeled content items 830. Such a classification is based on the same features which were used to train the classification model 820. It should be appreciated that such features (e.g. title, length, author, term frequency, and/or inverse document frequency) can be readily ascertained from a content item with minimal or no analysis necessary by a human operator.

As such, labelling unlabeled content items 830 using classification model 820 can be carried out relatively quickly and efficiently. Applying the classification model 820 to unlabeled content items 830 yields a second set of labeled content items 850. Labeled content items 850 which have been assigned a favourable label (e.g. "recommend" or "suggested") may then be sent to a user or group of users as content which is likely to be of interest.

The foregoing process may be considered akin to unsupervised learning approaches, as the classifier does not require any supervision (i.e., training data or unlabelled content) to yield useful classifications. Unsupervised learning is the machine learning task of inferring a function to describe hidden structure from unlabelled data. By identifying intersections between knowledge representation 330 and unlabeled content items 830, useful representations/features of unlabeled content items 830 (i.e., hidden structures comprising a semantic representation specific to object of interest 310) are generated. Moreover, the process of FIG. 7 may be extended to techniques for clustering content items around features derived attributes of the knowledge representation (described in further detail below).

Figure 9:
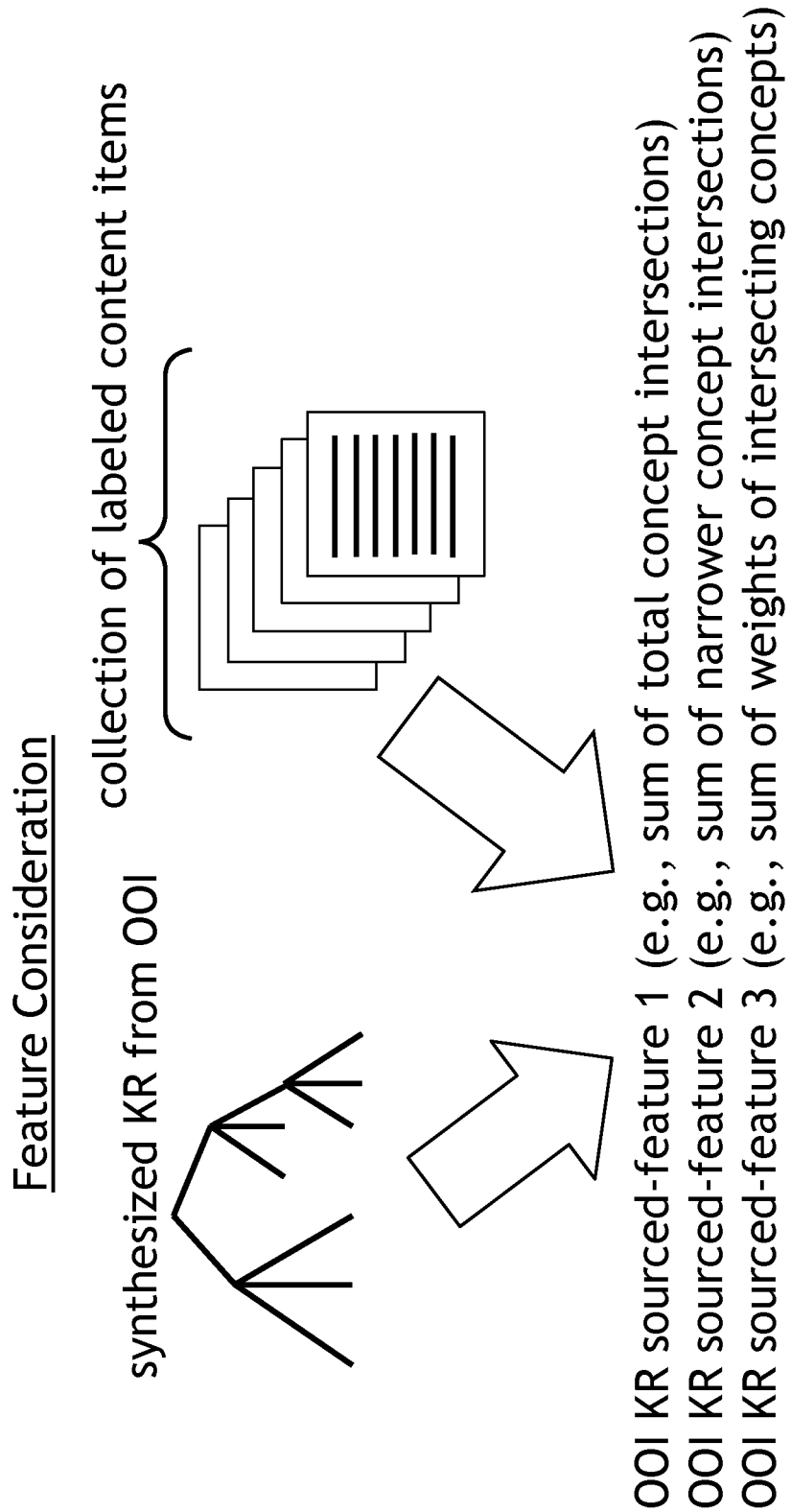
FIG. 9 is an illustration of an exemplary workflow for analyzing content items based on features derived from a knowledge representation based on an object of interest.

FIG. 9 is an illustration of an exemplary workflow for classifying unlabeled content items with a machine-learning classifier using attributes derived from a knowledge representation based on an object of interest. As noted above in relation to FIGS. 3-6, an object of interest 310 can be used to synthesize a knowledge representation 330 which comprises at least one concept and/or relationship between two or more concepts. In some embodiments, the knowledge representation is encoded as a non-transitory computer-readable data structure.

As shown in FIG. 9, a collection of labeled content items can be used as training data for a machine-learning algorithm. It may be possible to use the knowledge representation 330 as a source of features for a machine-learning classification model. Examples of content item features based on attributes derived from the knowledge representation may include a total number of concept intersections between a knowledge representation and a content item, a number of narrower concept intersections between a knowledge representation and a content item, or a sum of weights of intersecting concepts. A person skilled in the art will appreciate that many combinations and weighted sums of these attributes may also be used as features for a machine-learning classification model. Further examples are described in greater detail below.

Figure 10A:
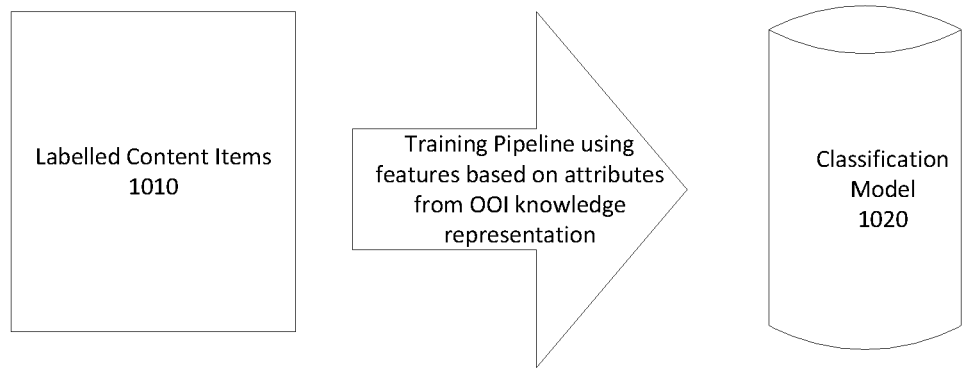
FIG. 10A is an illustration of an exemplary workflow for training a classifier model using features from a knowledge representation derived from an object of interest, in accordance with some embodiments of the present invention.

FIG. 10A is an illustration of an exemplary workflow for training a classifier model using features from a knowledge representation derived from an object of interest, in accordance with some embodiments of the present invention. Training data comprising a first set of one or more labeled content items 1010. In some embodiments, each label classifies a content item into one or more categories. In some embodiments, there may also be a set of validation data comprising a second set of one or more labeled content items.

A machine-learning classifier 1020 is trained from features based on one or more attributes derived from the knowledge representation and the labeled content items 1010. Training the classification model 1020 may comprise inferring one or more functions using at least one feature of a content item in the training data set based on one or more of the attributes derived from the knowledge representation, and on the label associated with a content item in the training data set.

Figure 10B:
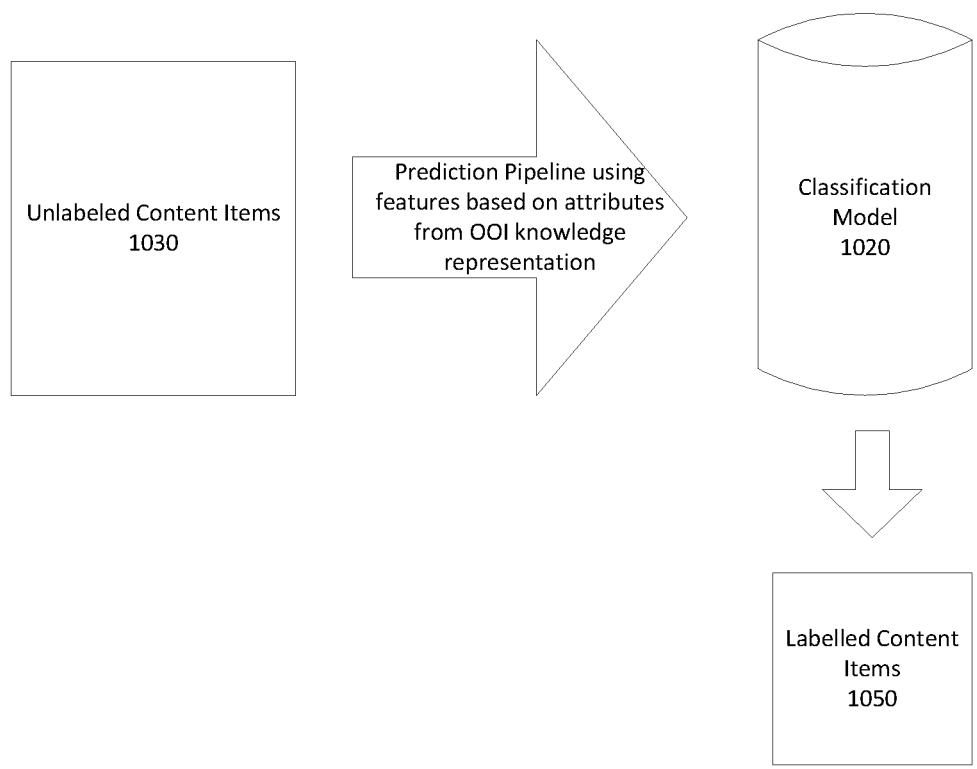
FIG. 10B is an illustration of an exemplary workflow for using the classifier model of FIG. 10A to label content items, in accordance with some embodiments of the present invention.

FIG. 10B is an illustration of an exemplary workflow for using the classifier model of FIG. 10A to classify unlabeled content items, in accordance with some embodiments of the present invention. A set of at least one unlabeled content item 1030 is analyzed by the classification model 1020, which classifies the at least one unlabeled content item 1030 into a second set of at least one labeled content items 1050. In some embodiments, the classifying uses at least one feature based on the one or more attributes derived from the knowledge representation and the contents of the unlabeled content item.

FIG. 11 is an illustration of an example table showing attributes associated with content items, the known relevance of the content items, and the prediction by the classifier, in accordance with some embodiments of the present invention. In FIG. 11, the training set of labeled content items comprises content items 1 to 50. In this example, the label classifies a content item as being relevant to an object of interest, or not relevant to the object of interest (denoted by Y for "yes", and N for "no" in the table). In addition, there is a validation data set comprising a second set of labeled content items, denoted by content items 51-100. Content items 101-n are unlabeled content items for which the label (and thus the relevance to the OOI) is not known.

FIG. 11 further shows corresponding values for features of the training data and validation data items which are based on first and second attributes (denoted as "Attribute 1" and "Attribute 2") of the knowledge representation. Although values for features based on two attributes are illustrated in FIG. 11, some embodiments may use features based one attribute for training the classifier model. Some embodiments may also use two or more features based on attributes to train the classifier model. It should be further noted that although the label in the example in FIG. 11 is binary (i.e. the only options are Y or N), this is not necessarily the case and the systems and methods described herein can be used to classify content items into more than two groups.

The values for features based on Attribute 1 and Attribute 2 for each content item in the table in FIG. 11 may be based on an intersection of these attributes and the contents of the content item. The attributes are derived from the synthesized knowledge representation, and may include, for example, a total number of concepts intersecting between the knowledge representation and the content item, a number of broader concepts intersecting between the knowledge representation and the content item, a number of narrower concepts intersecting between the knowledge representation and the content item, and a sum of weights of concepts intersecting between the knowledge representation and the content item.

Using the exemplary OOI 310 shown in FIG. 4 and the synthesized knowledge representation 330 shown in FIG. 6 as an example, it can be seen that the knowledge representation 330 comprises a hierarchy of concepts with different breadths. For example, the "organ" concept is broader than the "brain" and "skin" concepts in the knowledge representation 330. Likewise, the "redness" concept is narrower than the "symptoms" concept. Each of these concepts in knowledge representation 330 may also have a weight associated therewith.

Continuing with the example, Attribute 1 in FIG. 11 is "number of broader concepts" and Attribute 2 is "number of narrower concepts". Content item 1 can be compared and/or intersected with the knowledge representation 330, and it can be determined that content item 1 contains 7 instances of the word "organ" for an Attribute 1 score of 7, and 30 instances of the word "redness" for an Attribute 2 score of 30. Likewise, content item 2 might contain 5 instances of the word "brain" and 10 instances of the word "skin", for an Attribute 1 score of 15. Content item 2 might also contain 15 instances of the word "cancer" and no instances of the word "redness", for an Attribute 2 score of 15. A person skilled in the art will appreciate that although Attribute 1 and Attribute 2 are properties of the knowledge representation 330, the scores in the table of FIG. 11 are based on features of the content items that are intersected with the attributes, which are derived from the knowledge representation 330.

Since the "known relevance" label is already known for content items 1 and 2 (and more generally, content items 1-50), a classifier model can be developed based on detected relationships between the feature-based Attribute 1 and Attribute 2 values and the resulting label. It should be appreciated that when attributes derived from the synthesized knowledge representation 330 are used as features for training the machine-learning classifier, fewer training data items may be required to develop a classifier model with a predefined level of accuracy as compared to the use of so-called "standard features" of the content item (e.g. title, length, author, or the like) for the training of a machine-learning classifier.

Leveraging synthetic means, along with the attributes yielded thereof as features, may help avoid problems of data sparsity where the expression of data in either OOI 310 or unlabeled content items is too limited to yield any useful classification using only "standard features." For example, a single tweet of OOI 310 or the titles of unlabeled content items 1030 may simply not provide enough information (and in some cases the literal expression of titles in several unlabeled content items 1030 may not be sufficiently differentiated from one another) for the classifier to accurately categorize the content items. By instead leveraging feature-based attributes sourced from the knowledge representation, the system is provided with a greater amount of data that may avoid the shortcomings of relying on features applied with traditional machine-learning approaches.

Once the machine-learning classifier has been trained using the training data, the classifier model may then be validated using validation data items (e.g. content items 51-100 in FIG. 11). As can be seen, values for features based on Attribute 1 and Attribute 2 are determined for each validation data item, and the prediction by the classifier based on the values for features based on Attribute 1 and Attribute 2 is shown in the right-most column of FIG. 11. The label assigned to content items 51 and 100 are correct, while the label predicted by the classifier for content item 99 is incorrect. In some embodiments, a minimum level of accuracy for a classifier model may be required. If the rate of correct predictions for a classifier model is below an acceptable threshold, the system may use additional training data to further train the machine-learning classifier. For example, in some embodiments, the machine-learning classifier could be trained using both the training data and the validation data sets in the event that the classifier based only on the training data set did not achieve the requisite level of accuracy.

Once trained, the machine-learning classifier can then be used to classify content items which do not have a label. As shown in FIG. 11, content items 101 and 102 contain a "?" in the "Known relevance" column, and the machine-learning classifier has predicted "N" and "Y" labels, respectively.

In some embodiments, more than one machine-learning classifier can be trained. For example, referring to FIG. 12, a first classifier ("Classifier 1") can be trained using features of the training data content items based on Attribute 1 and Attribute 2. A second classifier ("Classifier 2") can be trained using features based on a different subset of the attributes. For example, the second classifier can be trained using only features based on Attribute 1. As can be seen, the labels predicted by the first and second classifiers may be different for the same content item, depending on the correlations between a particular attribute or set of attributes and the label associated therewith for a particular content item.

FIG. 13 is an illustration of an example table showing the results of predictions made by a plurality—or an ensemble—of classifier models, in accordance with some embodiments of the invention. As shown, the predicted labels for unlabeled content items 101-105 are shown for first, second and third classifiers trained using different sets or subsets of features based on different the attributes. In some embodiments, an overall label can be generated according to a weighted sum of the predictions from the different classifiers. In the example shown in FIG. 13, each classifier is binary (meaning a label of Yes or No is assigned) and each classifier is equally weighted. Accordingly, a 'Yes' prediction can be given a value of 1, and a 'No' prediction can be given a value of 0. The average score can then be taken for each content item for an overall label. In the example shown in FIG. 13, content items with an average score above 0.5 are given a 'Yes' label, while content items with a score below 0.5 are given a 'No' label. In some embodiments, assigning a label to a content item is akin to classifying a content item into one of a number of possible categories (e.g. "relevant to OOI" or "not relevant to OOI").

It should be noted that the thresholds and weights assigned to particular classifiers can be selected to achieve desired results. The equally-weighted system shown in FIG. 13 with binary classifiers is merely an example. In some embodiments, classifiers are not weighted equally, and classifiers may optionally produce more than two possible labels (e.g. "recommended", "suggested", and "not recommended"). Another example classification is "duplicate" or "not duplicate", in which a classifier can be trained to classify content items as being too similar to an object of interest to recommend (for example, if an article contains the same text as the object of interest but is released by a different publishing source).

As noted above, in some embodiments, the knowledge representation is synthesized based on contents of the object of interest. In some embodiments, the synthesizing comprises generating at least one concept and/or relationship between two or more concepts, wherein the concepts and/or relationships are not recited in the object of interest. In some embodiments, the synthesized knowledge representation may apply generative rules to an elemental data structure to synthesize a new complex knowledge representation. The knowledge representation may also include weights associated with at least one concept. Moreover, the knowledge representation can take into consideration the traits of a particular user, or a particular group of users. For example, if it is known that a particular user has an interest in tennis, this can be taken into account in the knowledge representation by, for example, assigning a greater weight to concepts related to tennis, or by generating additional concepts related to tennis and adding them to the knowledge representation. Accordingly, a machine-learning classifier trained using attributes from a knowledge representation customized for a particular user or group of users may yield differing classifications for the same content item, relative to a classifier trained using attributes from a knowledge representation which is not specific to a particular user or group of users.

In some embodiments, the training data used to train the machine-learning classification models is generated in accordance with the process described above in relation to FIG. 7.

As noted above, a function inferred by a supervised learning algorithm may be based on an observed or detected correlation between various features of a training data content item and the label assigned thereto. It is possible that some of the features of a content item may have little to no bearing on the resulting label, while other features may have a very close correlation to the resulting label. For example, features based on attributes relating to the number of narrower concepts in the knowledge representation which are contained in the content item may have a stronger correlation with the label than features based on attributes relating to a number of broader concepts.

It would be desirable to identify features of training data content items and/or attributes of knowledge representations which tend to have a higher correlation with the label assigned to the training data object. Training a machine-learning classifier with a greater emphasis on such features or attributes may result in greater overall accuracy for a classifier, or potentially for a reduction in the amount of training data items required to train a classifier to an acceptable accuracy range. Moreover, the identification of such features and/or attributes may also reduce the number of attributes or features to be evaluated for each training data item. This may in turn reduce the computing complexity of the machine learning algorithm, and processing costs associated therewith.

Figures 14A, 14B:
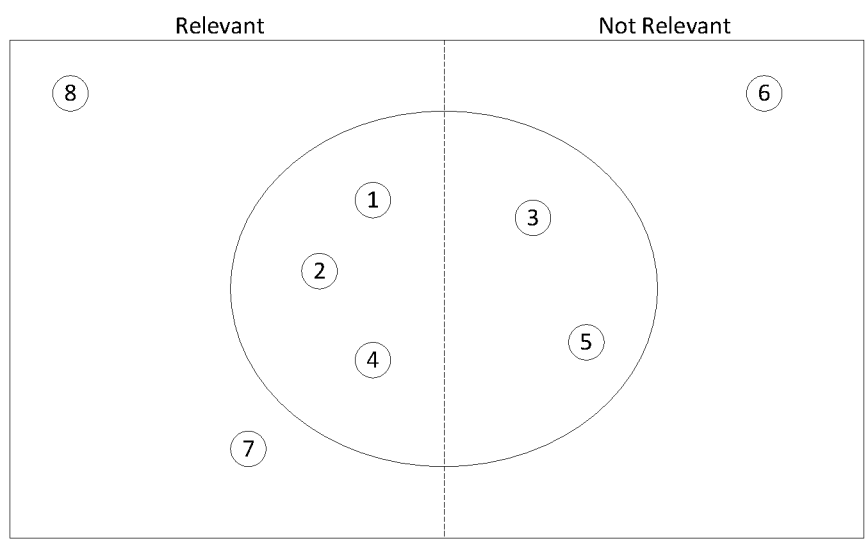
FIG. 14A is an illustration of an example table showing the accuracy of the labels predicted by a classifier, in accordance with some embodiments of the invention.
FIG. 14B is a graphical illustration of the accuracy of a classifier, in accordance with some embodiments of the invention.

FIG. 14A is an illustration of an example table showing the accuracy of the labels predicted by a classifier, in accordance with some embodiments of the invention. As can be seen, the machine-learning classifier classifies validation content items 1, 2, 4 and 6 correctly, while validation content items 3, 5, 7 and 8 are classified incorrectly. Thus, the classifier has an accuracy rate of 50% for those 8 validation content items.

FIG. 14B is a graphical illustration of the accuracy of the results shown in FIG. 14A. As can be seen, content items 7 and 8 are relevant but are "missed" by the machine-learning classifier and fall outside the illustrated circle. Content items 1, 2 and 4 are correctly classified. Content items 3 and 5 are not relevant and incorrectly classified as being relevant. Content item 6 is not relevant, and is correctly classified.

One metric for evaluating the accuracy of a classifier is the concept of precision, which is defined as the ratio of the number of correctly labeled relevant items divided by the total number of items labeled as relevant by the classifier. In the example of FIG. 14B, the precision of the classifier would be ⅗ (since content items 1, 2 and 4 are correctly recommended, while content items 3 and 5 are incorrectly recommended).

Another metric for evaluating the accuracy of a classifier is the concept of recall, which is defined as the ratio of the number of correctly labeled relevant items divided by the total number of relevant items. In the example of FIG. 14B, the recall of the classifier would be ⅗ (since content items 1, 2 and 4 are recommended, while relevant items 7 and 8 are not).

Precision and recall are often competing goals for a classifier, since the focus of recall is to identify every relevant item, even if irrelevant items are also included, while the focus of precision is to only identify relevant items, while excluding irrelevant items. Stated another way, recall may be preferred over precision when avoiding false negatives is prioritized over avoiding false positives, while precision may be preferred over recall when avoiding false positives is prioritized over avoiding false negatives.

In some embodiments, a comparison of the predictions made by a machine-learning classifier can be compared to the label assigned to each validation content data item. The knowledge representation can then be modified based on this comparison.

For example, it may be observed in FIG. 14A that a higher score for a feature based on Attribute 2 correlates to a "Y" label, and the values for features based on Attribute 1 are relatively less correlated. Given this trend, the knowledge representation for the OOI can be modified to reflect such correlations. For example, if Feature Based on Attribute 2 in the example of FIG. 14A is the number of narrower concepts in the knowledge representation intersecting with each validation content item, the knowledge representation (e.g. FIG. 6) can be modified to include additional narrower concepts. For example, a concept of "sunburn" could be added in the "conditions" hierarchy, and a concept of "itching" could be added to the "symptoms" hierarchy". As another example, the weights associated with certain concepts in the knowledge representation (i.e. the narrower concepts) may be increased, and/or the weights associated with certain concepts (i.e. the broader concepts) may be decreased.

Figures 15A, 15B:
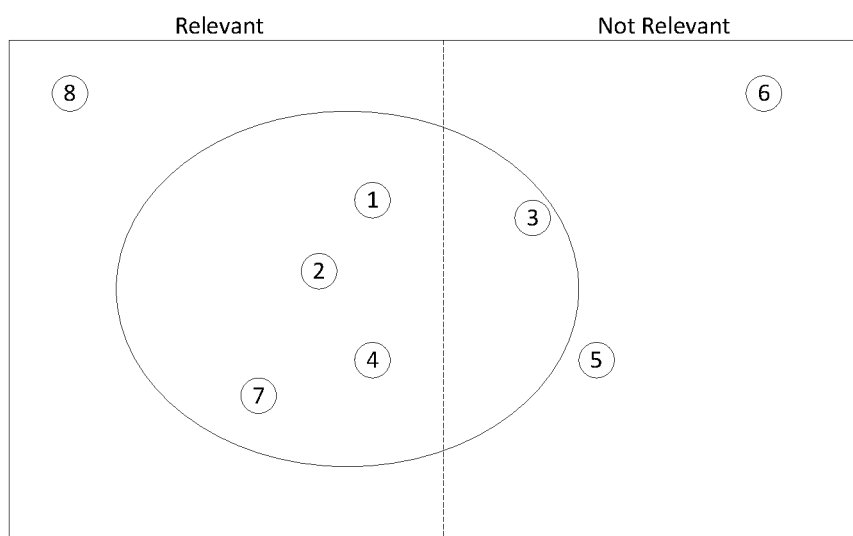
FIG. 15A is an illustration of an example table showing the values of attributes associated with a modified knowledge representation and the accuracy of the labels predicted by the classifier, in accordance with some embodiments of the invention.
FIG. 15B is a graphical illustration of the accuracy of the classifier of FIG. 15A, in accordance with some embodiments of the invention.

The modified knowledge representation can then be used to generate the values for features of content items based on each attribute. FIG. 15A reflects the updated values for each feature based on attributes in the knowledge representation for validation content items 1-8. As can be seen, the values for features based on Attribute 2 (which, in this example, corresponds to the number of narrower concepts) are inflated relative to the values in FIG. 14A. Although the values for Attribute 1 do not change in FIG. 15A, this may not necessarily be the case and the values illustrated herein are merely examples.

Using the values for features based on Attribute 1 and Attribute 2 using the modified knowledge representation, the machine-learning classifier can then predict labels for the validation content items anew. As noted above, the attributes may comprise at least one of a total number of concepts intersecting between the knowledge representation and the one or more labeled content items, a number of broader concepts intersecting between the knowledge representation and the one or more labeled concept items, a sum of weights of concepts intersecting between the knowledge representation and the one or more labeled content items, and/or a number of narrower concepts intersecting between the knowledge representation and the one or more labeled content items. As can be seen from FIG. 15A, the predicted relevance for certain content items is different using the modified knowledge representation.

FIG. 15B provides a graphical illustration of the results of the classifier using the modified knowledge representation with the machine-learning classifier. As can be seen, content items 1, 2, 4 and 7 are now correctly recommended, while content item 8 remains "missed" by the classifier. Content item 3 remains incorrectly recommended, while content item 5 is now correctly labeled as not relevant. Content item 6 remains correctly labeled as not relevant. Accordingly, the precision of the classifier using the modified knowledge representation in this example is now 4/5 (four content items correctly recommended, and five total content items recommended). The recall of the classifier using the modified knowledge representation is now 4/5 (four content items correctly recommended, and one relevant content item omitted). Thus, both the precision and recall of the machine-learning classifier have been improved in this example. It should be noted that some embodiments may only improve one of precision or recall by modifying the knowledge representation.

In some embodiments, the knowledge representation may be modified iteratively until a target precision or recall threshold has been achieved. For example, if the target precision is 9/10 (or 90%), then the results in FIGS. 15A and 15B would require further modifications to the knowledge representation in an effort to either label content item 8 as being relevant or to label content item 3 as not being relevant given FIGS. 15A and 15B illustrate 4/5 (or 80%) precision.

Figure 16:
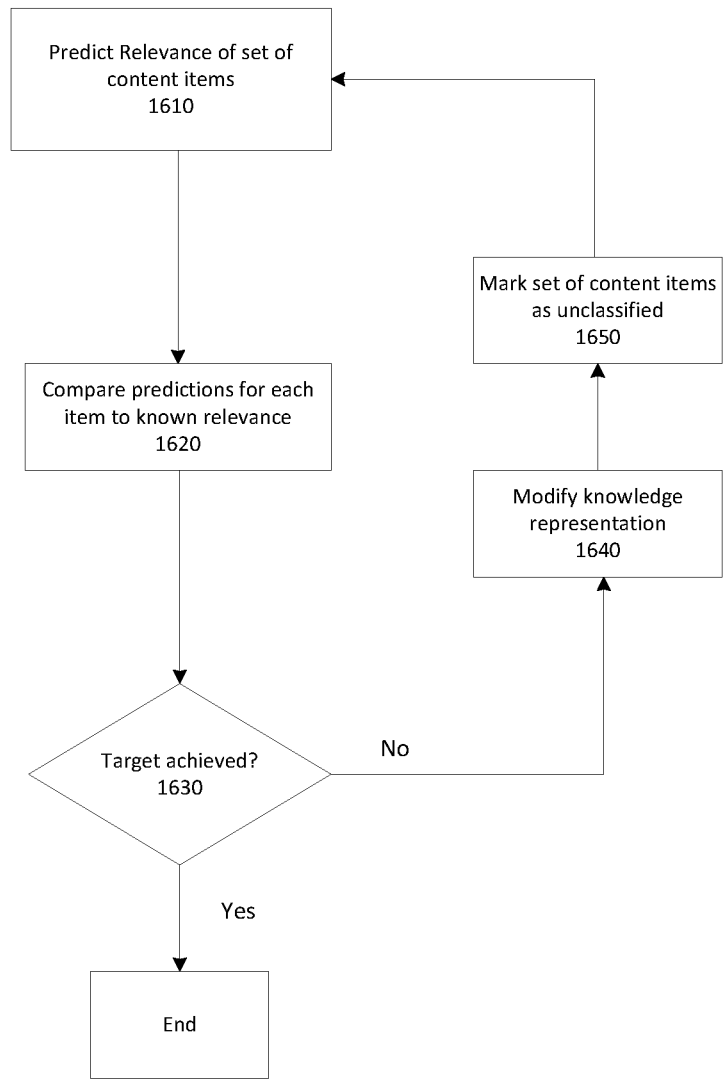
FIG. 16 is an illustration of an exemplary flowchart for modifying a knowledge representation based on the results of a classier, in accordance with some embodiments of the invention.

FIG. 16 is an illustration of an exemplary flowchart for modifying a knowledge representation based on the results of a classier, in accordance with some embodiments of the invention. At 1610, the machine-learning classifier predicts the relevance of a set of labeled content items (e.g. validation content items). At 1620, the predictions by the machine-learning classifier are compared to the known labels (which correspond to relevance in this example) of the validation data items. At 1630, it is determined whether a target has been achieved by the machine-learning classifier. In some embodiments, the target is a precision target. In some embodiments, the target is a recall target. In some embodiments, the target is a combination of precision and recall targets.

If the target is not achieved, then at 1640, the knowledge representation is modified. At 1650, the predicted labels for the validation content items are removed. The process then returns to 1610, where the relevance of the validation content items is predicted.

If at 1630, the target results have been achieved, then the process ends and the machine-learning classifier and knowledge representation can be used to predict the relevance of unlabeled content items.

Accordingly, some embodiments of the methods, systems and computer-readable media described herein may be useful in for one or more of generating training data for training machine-learning classifiers for identifying content relevant to an object of interest, using attributes of features from a synthesized knowledge representation based on an object of interest for training machine-learning classifiers, and/or for modifying synthesized knowledge representations based on the observed precision and/or recall values associated with a trained machine-learning classifier.

The current disclosure also contemplates applying the foregoing feedback loop to modify knowledge representations such that new relationships and/or concepts may be formed within the knowledge representation. For instance, if the occurrence of a particular concept or relationship in the knowledge representation results in an improved performance of the machine learning classifier, the method may recognize the improved performance and modify the knowledge representation to include said concept or relationship. By considering content pieces that do or do not possess a particular concept or relationship, patterns in the content may be identified to influence the constituency of the knowledge representation.

A machine learning classifier of the type described herein may also be used to determine whether two independent concepts already contained within the knowledge representation may be combined to form a new concept (or alternatively may be connected by some relationship type), for example by identifying that two independent and disconnected concepts (e.g., "fire" and "hose") should be joined by a relationship (e.g., "fire" is-related-to "hose") or alternatively combined to form a new concept (e.g., "firehose").

It should be noted that various inventive concepts may be embodied as one or more methods, of which multiple examples have been provided herein. The acts performed as part of the method may be ordered in any suitable way. Accordingly, embodiments may be constructed in which acts are performed in an order different than illustrated, which may include performing some acts simultaneously, even though shown as sequential acts in illustrative embodiments, or vice versa.

The above-described embodiments of the present invention can be implemented in any of numerous ways. For example, the embodiments may be implemented using hardware, software, or a combination thereof. When implemented in software, the software code may be embodied as stored program instructions that may be executed on any suitable processor or collection of processors (e.g., a microprocessor or microprocessors), whether provided in a single computer or distributed among multiple computers.

It should be appreciated that a computer may be embodied in any of numerous forms, such as a rack-mounted computer, a desktop computer, a laptop computer, or a tablet computer. Additionally, a computer may be embodied in a device not generally regarded as a computer, but with suitable processing capabilities, including a Personal Digital Assistant (PDA), a smartphone, a tablet, a reader, or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including networks such as a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory tangible computer-readable storage medium (e.g., a computer memory, one or more floppy discs, compact discs, optical discs, magnetic tapes, flash memories, circuit configurations in Field Programmable Gate Arrays or other semiconductor devices, etc.) article(s) encoded with one or more programs that, when executed on one or more computers or other processors, implement the various process embodiments of the present invention. The non-transitory computer-readable medium or media may be transportable, such that the program or programs stored thereon may be loaded onto any suitable computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, items, components, data structures, etc. that perform particular tasks or implement particular abstract data types. Typically the functionality of the program modules may be combined or distributed as desired in various embodiments.

Also, data structures may be stored in non-transitory tangible computer-readable storage media articles in any suitable form. For simplicity of illustration, data structures may be shown to have fields that are related through location in the data structure. Such relationships may likewise be achieved by assigning storage for the fields with locations in a non-transitory tangible computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications, and improvements will readily occur to those skilled in the art. Such modifications and improvements are intended to be within the spirit and scope of the invention. Accordingly, the foregoing description is by way of example only, and is not intended as limiting.

What is claimed is:

1. A method of generating training data for an untrained machine learning classifier, the method comprising:
    synthesizing a knowledge representation based on terms and/or properties of an object of interest, said knowledge representation being encoded as a non-transitory computer-readable data structure, said knowledge representation comprising at least one concept and/or relationship between two or more concepts, the synthesizing comprising:
        deriving, using at least one information source external to a first set of content items and the object of interest, at least a first concept or a first relationship of the at least one concept and/or relationship between two or more concepts that is not present in the object of interest to add to the knowledge representation based on a semantic relationship between the terms and/or properties of the object of interest and the first concept or first relationship; and
        including the first concept or first relationship in the knowledge representation such that the knowledge representation contains information semantically related to the terms and/or properties of the object of interest that is not explicitly present in the object of interest;
    determining one or more scores for one or more respective content items of the first set, wherein the first set of content items does not include the object of interest, wherein the score for a respective content item is based on the knowledge representation and contents of the respective content item, the knowledge representation including the first concept or first relationship;
    generating the training data for the untrained machine learning classifier by assigning a label to each respective content item of the first set based on the score associated with the respective content item of the first set, wherein the label classifies the respective content item into one or more categories; and
    training the untrained machine learning classifier using the generated training data.

2. The method of claim 1, wherein the knowledge representation includes a weight associated with the at least one concept.

3. The method of claim 1, wherein the score for the respective content item is based on an intersection of the at least one concept in the knowledge representation and the contents of the respective content item.

4. The method of claim 1, wherein the object of interest comprises one of a topic, a tweet, a webpage, a website, a document, a document title, a message, an advertisement, and a search query.

5. The method of claim 1, further comprising:
    training the untrained classifier to classify for one or more unclassified content items based on the labels assigned to the first set of content items and one or more features derived from the synthesized knowledge representation.

6. The method of claim 5, further comprising:
    receiving a second set of content items, wherein the second set comprises one or more content items; and
    assigning, by the trained classifier, a label to one or more of the content items of the second set based on one or more features associated with the respective one or more content items of the second set.

7. The method of claim 1, wherein assigning the label to the one or more respective content items of the first set comprises assigning the label based on the score for a respective content item of the first set exceeding a predetermined threshold.

8. The method of claim 1, wherein the label is one of "recommend" or "do not recommend".

9. The method of claim 5, wherein the one or more features comprise at least one of: title, length, author, term frequency, and/or inverse document frequency.

10. The method of claim 5, wherein the one or more features comprise one or more attributes of the knowledge representation.

11. A system for generating training data for an untrained machine learning classifier, the system comprising:
    at least one processor configured to perform a method comprising:
    synthesizing a knowledge representation based on terms and/or properties of an object of interest, said knowledge representation being encoded as a non-transitory computer-readable data structure, said knowledge representation comprising at least one concept and/or relationship between two or more concepts, the synthesizing comprising:
        deriving, using at least one information source external to a first set of content items and the object of interest, at least a first concept or a first relationship of the at least one concept and/or relationship between two or more concepts that is not present in the object of interest to add to the knowledge representation based on a semantic relationship between the terms and/or properties of the object of interest and the first concept or first relationship; and
        including the first concept or first relationship in the knowledge representation such that the knowledge representation contains information semantically related to the terms and/or properties of the object of interest that is not explicitly present in the object of interest;
    determining one or more scores for one or more respective content items of the first set, wherein the first set of content items does not include the object of interest, wherein the score for a respective content item is based on the knowledge representation and contents of the respective content item, the knowledge representation including the first concept or first relationship;

generating the training data for the untrained machine learning classifier by assigning a label to each respective content item of the first set based on the score associated with the respective content item of the first set, wherein the label classifies the respective content item into one or more categories; and training the untrained machine learning classifier using the generated training data.

12. The system of claim 11, wherein the knowledge representation includes weights associated with the at least one concept.

13. The system of claim 11, wherein the score for the respective content item is based on an intersection of the at least one concept in the knowledge representation and the contents of the respective content item.

14. The system of claim 11, wherein the object of interest comprises one of a topic, a tweet, a webpage, a website, a document, a document title, a message, an advertisement, and a search query.

15. The system of claim 11, wherein the method further comprises training the untrained classifier to classify one or more unclassified content items based on the labels assigned to the first set of content items and one or more features derived from the synthesized knowledge representation.

16. The system of claim 15, wherein the method further comprises:
receiving a second set of content items, wherein the second set comprises one or more content items; and
assigning, by the trained classifier, a label to one or more of the content items of the second set based on one or more features associated with the respective one or more content items of the second set.

17. The system of claim 11, wherein assigning the label to the one or more respective content items of the first set comprises assigning the label based on the score for a respective content item of the first set exceeding a predetermined threshold.

18. The system of claim 11, wherein the label is one of "recommend" or "do not recommend".

19. The system of claim 15, wherein the one or more features comprise at least one of title, length, author, term frequency, and/or inverse document frequency.

20. The system of claim 15, wherein the one or more features comprise one or more attributes of the knowledge representation.

21. At least one non-transitory computer readable storage medium storing processor executable instructions that, when executed by at least one processor, cause the at least one processor to perform a method of generating training data for an untrained machine learning classifier, the method comprising:
synthesizing a knowledge representation based on terms and/or properties of an object of interest, said knowledge representation being encoded as a non-transitory computer-readable data structure, said knowledge representation comprising at least one concept and/or relationship between two or more concepts, the synthesizing comprising:
deriving, using at least one information source external to a first set of content items and the object of interest, at least a first concept or a first relationship of the at least one concept and/or relationship between two or more concepts that is not present in the object of interest to add to the knowledge representation based on a semantic relationship between the terms and/or properties of the object of interest and the first concept or first relationship; and
including the first concept or first relationship in the knowledge representation such that the knowledge representation contains information semantically related to the terms and/or properties of the object of interest that is not explicitly present in the object of interest;

determining one or more scores for one or more respective content items of the first set, wherein the first set of content items does not include the object of interest, wherein the score for a respective content item is based on the knowledge representation and contents of the respective content item, the knowledge representation including the first concept or first relationship;

generating the training data for the untrained machine learning classifier by assigning a label to the each respective content item of the first set based on the score associated with the respective content item of the first set, wherein the label classifies the respective content item into one or more categories; and training the untrained machine learning classifier using the generated training data.

22. The at least one non-transitory computer readable storage medium of claim 21, wherein the knowledge representation includes weights associated with the at least one concept.

23. The at least one non-transitory computer readable storage medium of claim 21, wherein the score for the respective content item is based on an intersection of the at least one concept in the knowledge representation and the contents of the respective content item.

24. The at least one non-transitory computer readable storage medium of claim 21, wherein the object of interest comprises one of a topic, a tweet, a webpage, a website, a document, a document title, a message, an advertisement, and a search query.

25. The at least one non-transitory computer readable storage medium of claim 21, wherein the method further comprises training the untrained classifier to classify one or more unclassified content items based on the labels assigned to the first set of content items and one or more features derived from the synthesized knowledge representation.

26. The at least one non-transitory computer readable storage medium of claim 25, wherein the method further comprises:
receiving a second set of content items, wherein the second set comprises one or more content items; and
assigning, by the trained classifier, a label to one or more of the content items of the second set based on one or more features associated with the respective one or more content items of the second set.

27. The at least one non-transitory computer readable storage medium of claim 21, wherein assigning the label to the one or more respective content items of the first set comprises assigning the label based on the score for a respective content item of the first set exceeding a predetermined threshold.

28. The at least one non-transitory computer readable storage medium of claim 21, wherein the label is one of "recommend" or "do not recommend".

29. The at least one non-transitory computer readable storage medium of claim 25, wherein the one or more features comprise at least one of: title, length, author, term frequency, and/or inverse document frequency.

30. The at least one non-transitory computer readable storage medium of claim 25, wherein the one or more features comprise one or more attributes of the knowledge representation.

31. The method of claim 1, wherein training the untrained machine learning classifier comprises training the untrained machine learning classifier using only the generated training data.

32. The system of claim 11, wherein training the untrained machine learning classifier comprises training the untrained machine learning classifier using only the generated training data.

33. The at least one non-transitory computer readable storage medium of claim 21, wherein training the untrained machine learning classifier comprises training the untrained machine learning classifier using only the generated training data.

\* \* \* \* \*